April 27, 1948.  L. G. VOGEL  2,440,647
APPARATUS FOR MAKING A GRAPHIC RECORD OF A SUCCESSION
OF SIMILAR OPERATIONS BY A MACHINE
Filed Feb. 21, 1946  2 Sheets-Sheet 1
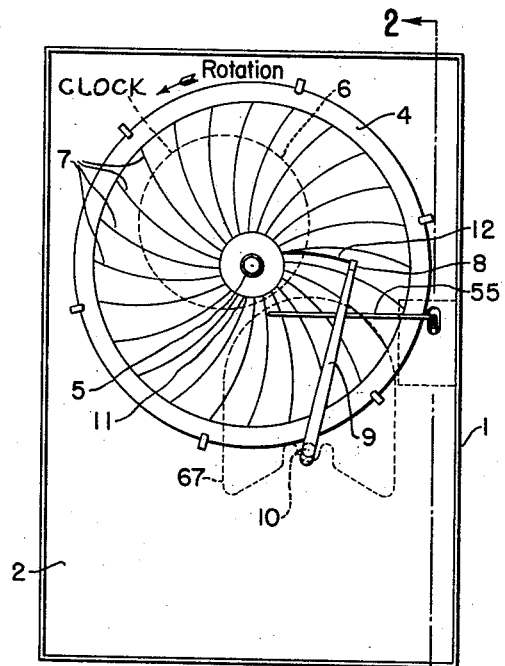
Fig. 1
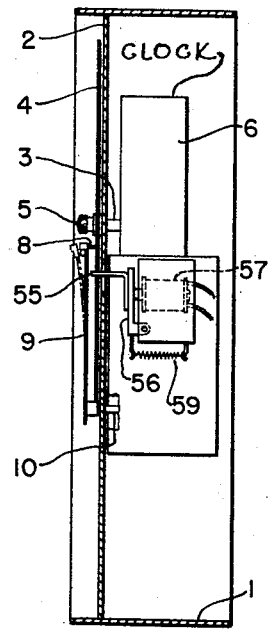
Fig. 2
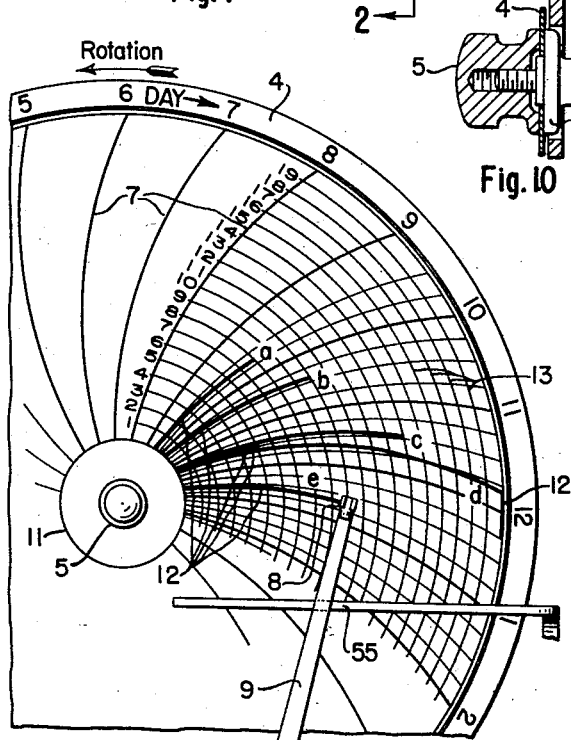
Fig. 10
Fig. 3
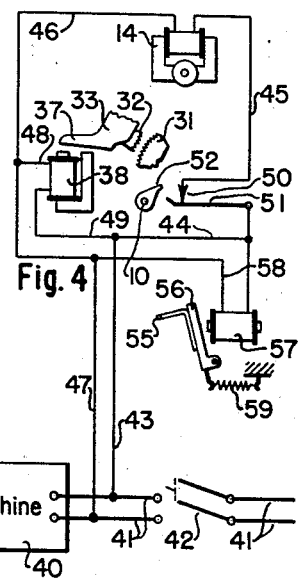
Fig. 4
INVENTOR
Leo G. Vogel.
BY Heard Smith Tennant
ATTORNEYS April 27, 1948.                      L. G. VOGEL                    2,440,647
            APPARATUS FOR MAKING A GRAPHIC RECORD OF A SUCCESSION
                       OF SIMILAR OPERATIONS BY A MACHINE
                             Filed Feb. 21, 1946                2 Sheets-Sheet 2
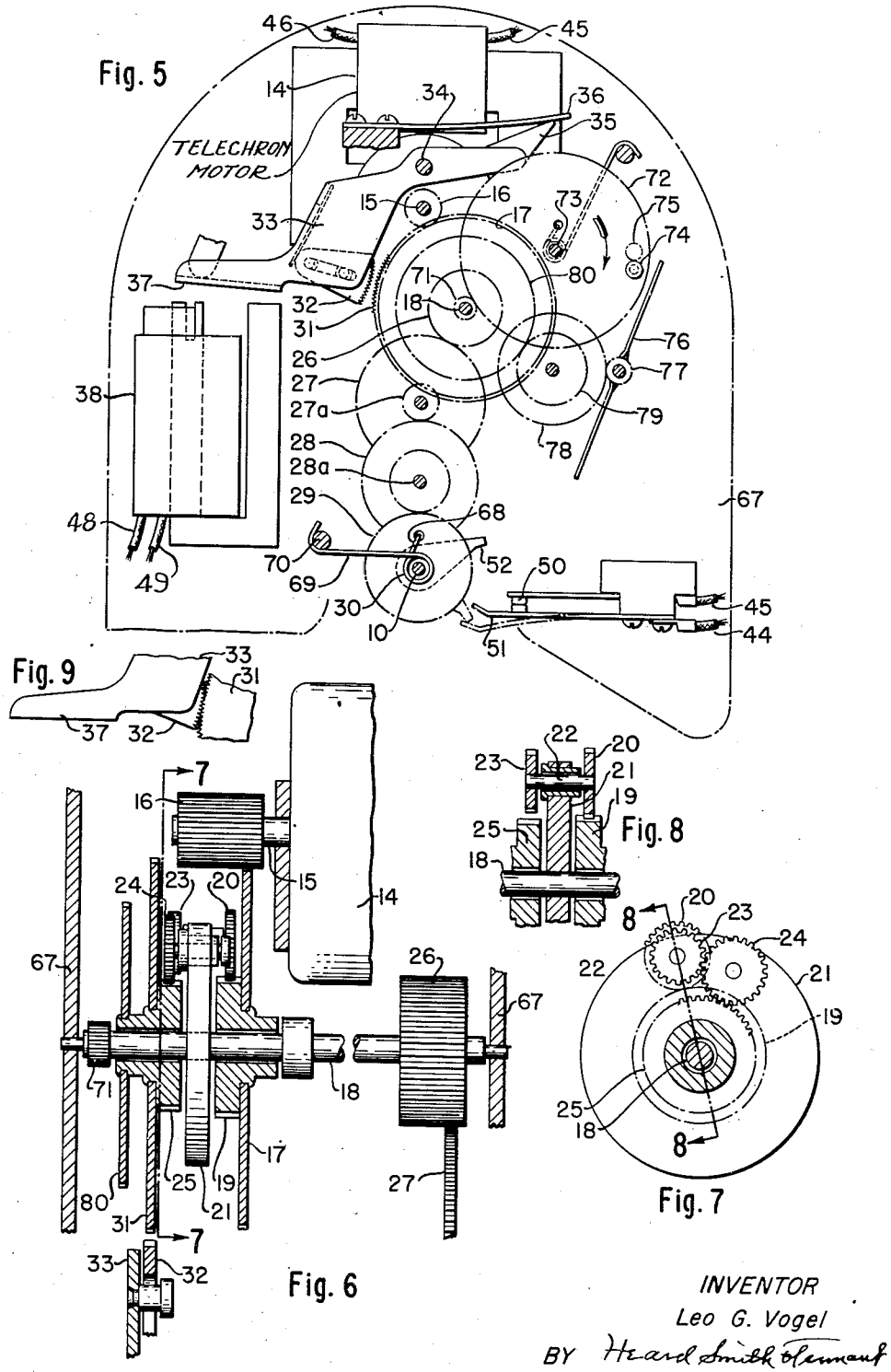
INVENTOR
Leo G. Vogel
BY Heard Smith & Tennant
ATTORNEYS Patented Apr. 27, 1948

2,440,647

UNITED STATES PATENT OFFICE 2,440,647

APPARATUS FOR MAKING A GRAPHIC RECORD OF A SUCCESSION OF SIMILAR OPERATIONS BY A MACHINE

Leo G. Vogel, Arlington, Mass., assignor to Industrial Appliance & Equipment Co., Inc., West Newton, Mass., a corporation of Massachusetts Application February 21, 1946, Serial No. 649,303

4 Claims. (Cl. 234—5.8)

This invention relates to recording apparatus and it has for its principal object to provide a novel recording apparatus which is constructed to make a graphic record on a chart or record sheet of each of a succession of similar operations performed by a machine, the record comprising an indication as to when each of these successive operations began, the time when each such operation stopped, and a graph or indicating line for each of the successive operations which tells the story as to the duration of each operation.

This invention is capable of being used with a large variety of different machines which are designed to perform such a succession of separate but similar operations, but for the purpose of illustration I will refer to its use in connection with dough mixing machines such as are used in bakeries. In the use of such machines, the ingredients for a batch of bread, for instance, or some other bakery product are introduced into the mixing machine and are then subjected to a mixing or kneading operation by the machine. Such kneading or mixing operation is supposed to be continued for a given interval of time and at the end of such interval the machine is stopped. In the making of bread, for instance, best results are secured when the kneading or mixing operation is continued for a definite prescribed interval of time only. If the mixing operation should exceed this time interval or should fall short of it, the bread resulting from the batch which was over mixed or under mixed would not have the fine qualities that would be present if the mixing had been carried out for the correct interval of time only.

These dough mixing machines are usually operated by an attendant who is supposed to note the time when the machine is started for mixing or kneading any batch and to stop the machine when the mixing has been carried on for the prescribed time interval. It sometimes happens, however, that either through carelessness, or for some other reason, the attendant fails to stop the machine after the mixing operation has been carried on for the prescribed time, but without any record having been made there would be no way of telling which batches were mixed properly and which were subjected to an overtime mixing.

My improved recording device will operate to furnish a graphic indication as to when the mixing machine was started for the mixing of each batch, when the mixing operation ceased, and will also provide on a chart or record sheet a line or graph indicating the exact time interval during which the mixer was in operation.

In order to give an understanding of my invention, I have illustrated in the drawings a selected embodiment thereof which will now be described and then further pointed out in the claims.

In the drawings:

Fig. 1 is a front view of a recording apparatus embodying my invention.

Fig. 2 is a section on the line 2—2, Fig. 1.

Fig. 3 is an enlarged fragmentary view of the record sheet showing the manner in which the graph line is drawn thereon.

Fig. 4 is a diagrammatic view illustrating the circuit connections of the apparatus.

Fig. 5 is a view partly in section illustrating the pen-moving means.

Fig. 6 is a fragmentary sectional view.

Fig. 7 is a section on the line 7—7, Fig. 6.

Fig. 8 is a section on the line 8—8, Fig. 7.

Fig. 9 is a fragmentary view showing the locking segment in locking engagement with the gear 31.

Fig. 10 is a fragmentary sectional view showing the manner in which the chart is removably secured to its supporting shaft.

My recording apparatus is shown as comprising a suitable casing, or enclosure, 1 within which the operative parts are received and which is provided with a transversely-extending supporting plate 2 on which the operative parts of the machine are supported.

Extending through this supporting plate 2 is a shaft 3 on which is mounted the chart or disk 4 on which the indicating graph is formed. The chart 4 is preferably circular in shape and is removably mounted on the shaft 3, the latter carrying at its outer end a knob 5 which is screw threaded to the shaft and by which the disk is clamped against a shoulder 66 with which the shaft is provided. The shaft 3 is driven by any suitable clockwork mechanism indicated generally at 6 and which may be secured to the back side of the supporting plate 2.

The record disk 4 may conveniently be divided peripherally into equal time intervals such, for instance, as hours, and I have herein shown it as divided into twenty-four equal parts representing the twenty-four hours of the day. The clock mechanism 6 is so arranged that the shaft 3 will make one complete rotation each twenty-four hours. Any suitable clock mechanism 6 may be used for this purpose.

The face of the disk 4 may also be provided with radially extending lines 7, one for each hour or one for each two or three or more hours as desired.

Cooperating with the disk 4 is a marking pen 8 by which the graph line is marked on the disk during the operation of the machine. This pen is shown as carried by an arm 9 which is mounted on a pen-carrying shaft 10 that extends through the supporting plate 2.

Suitable pen-moving means is employed to turn the shaft 10 and thus swing the arm to carry the pen 8 across the face of the disk 4.

The pen-moving means is constructed so that the pen initially has a position on the inner circle 11 of the disk, and means are provided whereby when the mixing machine with which the recording apparatus is used is started in operation, the pen-moving means will be rendered operative thereby to turn the shaft 10 clockwise in Fig. 1 with the result that the pen 8 will be moved outwardly from the circle 11 toward the periphery of the disk, during which movement it will draw a graph line 12 on the disk. The pen-moving means is also constructed so that when the mixing machine is stopped, the pen-moving means becomes inoperative and a return spring then automatically operates to return the pen to its initial position, means being provided whereby during the return movement the pen will be separated from the disk 4 and will therefore leave no return mark thereon.

The length of the graph line 12 thus constitutes a measure of the time interval during which the machine was in operation.

When the machine is again started, the above operations are repeated, but inasmuch as the clock mechanism 6 is advancing the dial or chart 4 in a counterclockwise direction, the next graph line 12, which is drawn on the chart to represent the second operation of the machine, will be spaced from the first graph line as indicated in Fig. 3, wherein the graph line marked $a$ represents the time interval during which the first of a series of successive operations of the machine continued, the graph line $b$ represents the time interval during which the second of such series of operations continued, the graph line $c$ represents the time during which the third of such operations continued, etc.

If desired, the disk 4 may be divided radially by circular indicating lines 13 to indicate divisions of the time interval during which the machine was in operation, and if, for instance, a fifteen-minute time interval would be the proper length of time for any batch of bread to be subjected to the mixing operation, then the circular lines 13 might indicate minutes, and by observing the location of the outer end of each graph line 12, the time interval during which the mixing operation corresponding to said graph line continued could be easily read.

Any suitable pen-moving means may be employed which will give the pen swinging movement of uniform speed, but I have shown herein a mechanism on the order of the well-known Telechron clock mechanism for this purpose, because this mechanism is one which readily lends itself to being started and stopped simultaneously with the starting and stopping of the mixing machine.

In the construction herein shown 14 represents a Telechron motor which will automatically start in operation when the motor circuit is closed and will automatically stop when the motor circuit is opened. The shaft 15 of the motor has a gear 16 thereon which meshes with and drives a gear 17 that is loosely mounted on a shaft 18 which is supported in the side plates 67 of the Telechron clock mechanism. The gear 17 has rigid therewith a smaller gear 19 which meshes with a planetary gear 20 carried by a disk 21 that is fast on the shaft 18. The planetary gear 20 is fast on a shaft 22 which extends through and is rotatably mounted in the disk 21, said shaft 22 having another planetary gear 23 fast thereon which meshes with a gear 24 carried by the disk 21, said gear 24 in turn meshing with a gear 25 which is co-axial with the gear 19 and which is also loose on the shaft 18. The shaft 18 has a gear 26 thereon which is connected through a train of reducing gearing 27, 27a, 28, 28a, to a gear 29 fast on the pen-carrying shaft 10.

Means are provided whereby when the Telechron motor 14 is set in operation, the gear 25 will be locked from rotative movement, and the turning movement imparted to the gear 16 by the Telechron motor 14 will thus operate through the gear 19 (which, as stated above, is co-axial with the gear 25) and planetary gears 20, 23, 24 to advance the disk 21 and thus rotate the shaft 18, the rotation of this shaft being communicated to the pen-carrying shaft 10 through the reducing gearing 26, 27, 27a, 28, 28a, 29.

When the Telechron motor stops, the pen-carrying shaft 10 is turned backwardly to restore the pen 8 to its initial position, this being permitted by the unlocking of the gear 25 so as to allow the train of gearing 26, 27, 27a, 28, 28a, 29 and the planetary gears to run backwards under the influence of a return spring presently to be described, it being understood that the gear 19 is at this time locked against turning movement by its operative connection with the Telechron motor.

The means for locking the gear 25 during the operation of the Telechron motor comprise a toothed wheel or disk 31 which is rigid with the gear 25 and a toothed locking segment 32 carried by a lever 33 which is pivoted at 34. The end 35 of this lever is acted upon by a spring 36 which tends normally to hold the lever in its inoperative position, as shown in Fig. 5, with the toothed segment 32 out of engagement with the toothed wheel 31. The lever 33 carries at its end the armature 37 of a magnet 38, the circuit 48, 49 of which is closed automatically when the mixer is started in operation, and is opened automatically when the mixer is stopped. The closing of the circuit 48, 49 energizes the magnet 38 and pulls the armature 37 downwardly thereby bringing the toothed segment 32 into mesh with the teeth of the wheel 31 as shown in Fig. 9, thereby locking said wheel from turning movement. When the circuit of the Telechron motor is opened and the motor stops, the magnet 38 will be de-energized and the lever 37 will resume its inoperative position shown in Fig. 5 by the action of the spring 36 thereby unlocking the gear 25.

The circuit connections by which these operations may be accomplished are illustrated in Fig. 4 wherein the mixing machine is indicated at 40, it being a motor-operated machine, the motor of which is supplied with current from the wires 41 of a power line. 42 indicates a switch by which the motor circuit can be closed and opened for starting and stopping the mixer 40. The circuit of the Telechron motor 14 is shown as comprising the wires 43, 44, 45 and the wires 46, 47. When the switch 42 is closed, the Telechron motor circuit will thus be energized and the Telechron motor will start in operation. When the switch 42 is opened to stop the mixer, the Telechron motor 14 stops.

The magnet 38 which controls the locking lever 33 is connected in parallel with the Telechron motor as indicated by the wire connections 48 and 49 so that the energizing of the Telechron motor circuit will also energize the magnet 38.

With the mechanism thus far described, it will be apparent that when the switch 42 is closed to start up the mixer 40, the Telechron motor 14 will be set in operation and the gear 25 will be locked from turning movement by means of the locking lever 33. As a result, the turning of the Telechron motor shaft 15 will operate through the gear 17 and planetary gearing above described to rotate the shaft 18, and this rotation will be transmitted through the reducing train of gears 26, 27, 27a, 28, 28a, 29 to the pen-carrying shaft 10 so that the latter will have a slow but uniform swinging movement in a direction to the right in Figs. 1 and 3 which will result in the pen 8 drawing one of the graph lines 12 on the chart 4.

When the switch 42 is opened and both the Telechron motor 14 and the magnet 38 are rendered inactive, the spring 36 will swing the locking lever 33 into its inoperative position shown in Fig. 5 thereby releasing the toothed wheel 31 and the gear 25 which is rigid therewith.

The gear 29 which is fast on the pen-carrying shaft 10 is provided with a return spring 30 which is coiled about said shaft, one end 68 of said spring being anchored to the gear 29 and the other end 69 of said spring being anchored to a rod 70 which extends across from one plate 67 to the other. This spring 30 is normally under more or less tension and is so constructed that when the gear 29 is turned to give the pen-carrying arm 9 its operative swinging movement from its initial position toward the right in Figs. 1 and 2 the spring 30 will be still further wound up and its tension still further increased.

As soon as the magnet 38 is de-energized and the spring 36 swings the locking lever 33 into its inoperative position thereby releasing the wheel 31 and gear 25, the return spring 30 operates automatically to turn the gear 29 and pen-carrying shaft 10 backwardly thereby to restore the pen to its initial position. During this return movement of the pen-carrying arm, the gear train 26, 27, 27a, 28, 28a will rotate backwardly. During this backward rotation, the gear 19 remains stationary because it is geared to the now inactive Telechron motor 14 but the planetary gearing 23, 24 permits backward rotation of the disk 21 and the shaft 18 because the gear 25 is free to rotate backwardly.

A suitable stop mechanism is provided to limit such backward rotation when the pen 8 reaches its initial position. The shaft 18 has fast thereon a gear 71 which meshes with the stop gear 72 carried by a shaft 73, and said stop gear 72 has a stop lug 74 which cooperates with a stop projection 75 carried by one of the plates 67.

The construction is such that when the Telechron motor 14 is operated to swing the pen-carrying arm 9 from its initial position, the stop gear 72 will be moving in the direction of the arrow in Fig. 5 thereby carrying the stop lug 74 away from the stop projection 75. When the Telechron motor is rendered inactive at the end of the operation, and the return spring 30 is returning the pen-carrying arm to its initial position, the reverse movement given to the gearing above described will bring the stop lug 74 back into engagement with the stop projection 75 thereby limiting such reverse movement.

76 indicates a fan or blade which is connected by gearing 77, 78, 79, 80 to the shaft 18, said fan operating by its rotation to steady the backward or reverse movement of the gearing induced by the return spring 30.

I have provided the mechanism for operating the pen with means whereby the Telechron motor will be rendered inoperative without de-energizing the magnet 38 in case the Telechron motor continues in operation long enough to carry the pen clear to the outer limit of the chart as indicated by the graph line d on the chart shown in Fig. 3. The Telechron motor circuit is provided with a switch comprising a switch contact 50 and a spring contact arm 51 which is normally engaging the contact 50 to maintain the Telechron circuit closed. Mounted on the pen-carrying shaft 10 is an arm 52 which is adapted to engage the free end of the contact arm 51 thereby to separate it from the contact 50 when the shaft 10 has been turned sufficiently to bring the pen 8 out to the peripheral portion of the chart 4. Hence if the mixing operation continues for a sufficient length of time to move the pen from its initial position clear to the periphery of the chart, then the Telechron motor circuit will be opened by the separation of the contacts 51 and 50 and the Telechron will become inactive. The separation of contacts 50, 51, however, does not de-energize the magnet 38 and hence the gear 25 will still be locked from movement. When this condition exists, the pen-carrying shaft 10 will be locked against turning movement in either direction and the pen 8 will remain in its outer position at the periphery of the disk 4. If the mixing operation still continues, the rotation of the disk 4 by the clock mechanism 6 will cause the pen to make a line at the periphery of the disk extending circumferentially thereof as indicated at 12a in Fig. 3. The length of the radial line such as the line d in Fig. 2 added to the length of the portion 12a of the line will give the total length of time that the mixer was in operation for that particular batch and thus the amount of overtime mixing can be readily read from the chart.

The pen-carrying arm 9 is resilient and is biased so that normally it presses the pen against the chart with the corect amount of pressure to make the graph line thereon.

Means are provided whereby when the pen is to be returned to its initial position, it is separated from the chart so that during the return movement it does not make any mark on the chart. For his purpose I have provided an arm 55 which is located between the pen-carrying arm 9 and the chart, and which is connected at one end to the armature 56 of a magnet 57, the circuit 58 of which is connected to the circuit of the Telechron motor. The armature 56 is acted upon by a spring 59 which normally holds it spaced from the magnet thereby holding the arm 55 spaced from the chart a sufficient distance to flex the pen-carrying arm 9 and separate the pen from the chart as shown by dotted lines Fig. 2. When, however, the circuit to the motor for the mixer is closed by the switch 42, the magnet 57 becomes energized thereby swinging the armature 56 to the right in Fig. 4 and moving the arm 55 toward the chart thereby allowing the resiliency of the pen-carrying arm 9 to bring the pen 8 into contact with the chart.

When the mixer is stopped by opening the switch 42, the magnet 57 becomes de-energized and the spring 59 operates to swing the arm 55 outwardly into a position to engage the pen-carrying arm 9 and thus lift the pen from the chart.

While I have herein described the invention as it might be used in connection with a machine for mixing dough, yet I wish it to be clearly understood that the invention is not limited to any particular machine, but is applicable for use with any machine that is designed to perform a succession of similar operations and it is desired to provide a graphic indication as to the length of time that each operation continued.

I claim:

1. A recording apparatus for making a graphic record of a series of successive similar operations performed by a machine, said recording apparatus comprising means for supporting and moving a chart, a recording pen, a shaft on which said pen is mounted, turning movement of the shaft moving the pen over the chart, a Telechron motor and a circuit therefor, means to close said circuit and thus render the Telechron motor operative when the machine is started and to open the circuit and thus render the Telechron motor inoperative when the machine is stopped, driving connections between the Telechron motor and said shaft comprising two co-axial gears, a disk co-axial with said gears, planetary gears carried by the disk and meshing with said co-axial gears, driving connections between one of said co-axial gears and the Telechron motor, operative connections between said disk and the pen-carrying shaft, and means to lock the other of said co-axial gears from rotation when the machine is started, whereby when the machine is in operation the pen-carrying shaft is actuated through one of said co-axial gears and the planetary gears.

2. A recording apparatus for making a graphic record of a series of successive similar operations performed by a machine, said recording apparatus comprising means for supporting and moving a chart, a recording pen, a shaft on which said pen is mounted, turning movement of the shaft moving the pen over the chart, a Telechron motor and a circuit therefor, means to close said circuit and thus render the Telechron motor operative when the machine is started and to open the circuit and thus render the Telechron motor inoperative when the machine is stopped, driving connections between the Telechron motor and said shaft comprising two co-axial gears, a disk co-axial with said gears, planetary gears carried by the disk and meshing with said co-axial gears, driving connections between one of said co-axial gears and the Telechron motor, operative connections between said disk and the pen-carrying shaft, and means to lock the other of said co-axial gears from rotation when the machine is started, and to release said gear when the machine is stopped, and a return spring acting on said pen-carrying shaft, whereby when the machine is in operation the pen-carrying shaft is actuated through the unlocked co-axial gear and said planetary gear, and when the machine is stopped the releasing of the locked gear allows the return spring to turn the pen-carrying shaft back to its initial position.

3. A recording apparatus for making a graphic record of a series of successive similar operations performed by a machine, said recording apparatus comprising means for supporting and time mechanism for moving a chart, a recording pen, a shaft on which said pen is mounted, turning movement of the shaft moving the pen over the chart, a Telechron motor and a circuit therefor, means other than the time mechanism to close said circuit when the machine is started and to maintain said circuit closed during the operation of the machine thereby rendering the Telechron motor continuously operative while the machine is in operation, and to open the circuit and thus render the Telechron motor inoperative when the machine is stopped, and driving connections between said Telechron motor and said shaft to give the shaft a turning movement during the time the Telechron motor is operating.

4. A recording apparatus for making a graphic record of a series of successive similar operations performed by a machine, said recording apparatus comprising means for supporting and moving a chart, a recording pen, a shaft on which said pen is mounted, turning movement of the shaft moving the pen over a chart carried by said supporting means in a direction at an angle to the direction of movement of the chart, a Telechron motor and a circuit therefor, means to close said circuit and thus render the Telechron motor operative when the machine is started and to open the circuit and thus render the Telechron motor inoperative when the machine is stopped, driving connections between the Telechron motor and said shaft comprising two co-axial gears, a disk co-axial with said gears, planetary gears carried by the disk and meshing with said co-axial gears, driving connections between one of said co-axial gears and the Telechron motor, operative connections between said disk and the pen-carrying shaft, means to lock the other of said co-axial gears from rotation when the machine is started, and means operative when the recording pen has completed its maximum movement over the chart to open the circuit of the Telechron motor without releasing the co-axial gear which is locked, whereby the pen is held from movement while the chart continues to move during the remainder of the operation of the machine.

LEO G. VOGEL.

REFERENCES CITED

The following references are of record in the file of this patent:

UNITED STATES PATENTS

| Number | Name | Date |
|---|---|---|
| 1,285,919 | Brown | Nov. 26, 1918 |
| 2,283,993 | Holtz | May 26, 1942 |
| 2,341,407 | Xenis et al. | Feb. 8, 1944 |
| 2,357,051 | McLaine | Aug. 29, 1944 |
| 2,395,658 | Disney | Feb. 26, 1946 |